United States Patent [19]

Sato et al.

[11] Patent Number: 5,022,475
[45] Date of Patent: Jun. 11, 1991

[54] MEASURING EQUIPMENT

[75] Inventors: Akira Sato, Saitama; Kazuaki Hama, Tokyo; Makoto Nakao, Tokyo; Junichi Misawa, Tokyo; Hiroyuki Suzuki, Kanagawa, all of Japan

[73] Assignees: Bridgestone Corporation; Misawa Shokai Co., Ltd., both of Tokyo, Japan

[21] Appl. No.: 449,673

[22] Filed: Dec. 12, 1989

[30] Foreign Application Priority Data

Dec. 19, 1988 [JP] Japan ................... 63-319971

[51] Int. Cl.$^5$ ............... G01G 3/14; G01L 5/16; G01L 122
[52] U.S. Cl. ................. 177/211; 73/862.04; 73/862.66
[58] Field of Search ............... 177/211, 255; 73/862.04, 862.65, 147

[56] References Cited

U.S. PATENT DOCUMENTS 3,988,934 11/1976 Kamphoefner et al. ..... 73/862.04 X
4,726,436 2/1988 Fukuyama et al. ................. 177/211

FOREIGN PATENT DOCUMENTS 3340355 5/1985 Fed. Rep. of Germany ...... 177/211

Primary Examiner—George H. Miller, Jr.
Attorney, Agent, or Firm—Jordan and Hamburg

[57] ABSTRACT

A measuring apparatus in which two opposite sides of a load receiving plate to which a load is to be applied are coupled to two sides of an inner frame enclosing the load receiving plate by means of at least four inner beams. The measuring apparatus also comprises an outer frame enclosing the inner frame, two sides of which are coupled to other two sides of the inner frame by means of at least four outer beams, whereby the load receiving plate and inner frame are supported by the outer frame. Further, strain gauges are provided on the inner and outer beams, and strains of these beams are detected by the strain gauges and measured as electrically processed and amplified.

7 Claims, 2 Drawing Sheets 6A, 6C, 6D, 6F 6B, 6E

MEASURING EQUIPMENT

BACKGROUND OF THE INVENTION

The present invention relates to measuring equipment capable of measuring not only weight of vehicle or the like (in the Z-axial direction) and a force which moves an automobile under test within a wind tunnel, namely, a horizontal load (in the X-axial direction), but also a third component of a load in a horizontal direction perpendicular to the X-axial direction (Y-axial direction).

Measuring equipment using strain gauges instead of load cells is disclosed in U.S. Pat. No. 4,726,436. However, this conventional measuring equipment cannot measure simultaneously forces in two different directions perpendicular to each other in a horizontal plane, that is, in the X- and Y-directions.

Recently, it has become increasingly necessary to measure the vectors of a force, i.e., magnitudes in the X-, Y- and Z-directions, for measurement and control of forces in precision machine tools such as an NC milling cutter, robots and so forth.

SUMMARY OF THE INVENTION

Accordingly, the present invention has an object to provide measuring equipment, i.e., apparatus capable of measuring the loads in at least X-, Y- and Z-directions to meet the above mentioned needs.

The above object can be accomplished by providing measuring equipment comprising a load receiving plate to which a load is to be applied, and inner frame enclosing the load receiving plate, at least four inner beams coupling two opposite sides of the load receiving plate to two opposite sides of the inner frame, an outer frame enclosing the inner frame, and at least four outer beams coupling two opposite sides of the outer frame and two inner sides of the inner frame to the inner beam in directions perpendicular to the inner frame, whereby the load receiving plate and inner frame are supported by the outer frame. Also, there are provided on the inner and outer beams strain gauges which detect strains in the respective beams. The strains are electrically processed and amplified for measurement.

According to the present invention, the load receiving plate to which a load is to be applied is supported by the inner frame by means of a minimum of four inner beams and the inner frame is supported by the outer frame by means of a minimum of four outer beams, and the strain gauges provided on predetermined places on the inner and outer beams detect a strain in a direction perpendicular to the load receiving plate, namely, in Z-axial direction, and strains in X-axial and Y-axial derections perpendicular to each other in the horizontal plane of the load receiving plate, thereby permitting to measure loads in two different directions in the horizontal plane and a load in a direction perpendicular to the load receiving plate, namely, weight.

Furthermore, since the load receiving plate and inner and outer frames are coupled to each other by means of the inner and outer beams, namely, since an integral plate-like structure is attained, the measuring equipment according to the present invention is so sturdy that it is not easily broken and also can be designed compact and lightweight as a whole.

These and other objects and advantages of the present invention will be better understood from the ensuing description made, by way of example, of the preferred embodiment of the present invention with reference to the drawings.

DETAILED DESCRIPTION OF THE PREFERRED EMBODIMENT

Figure 1:
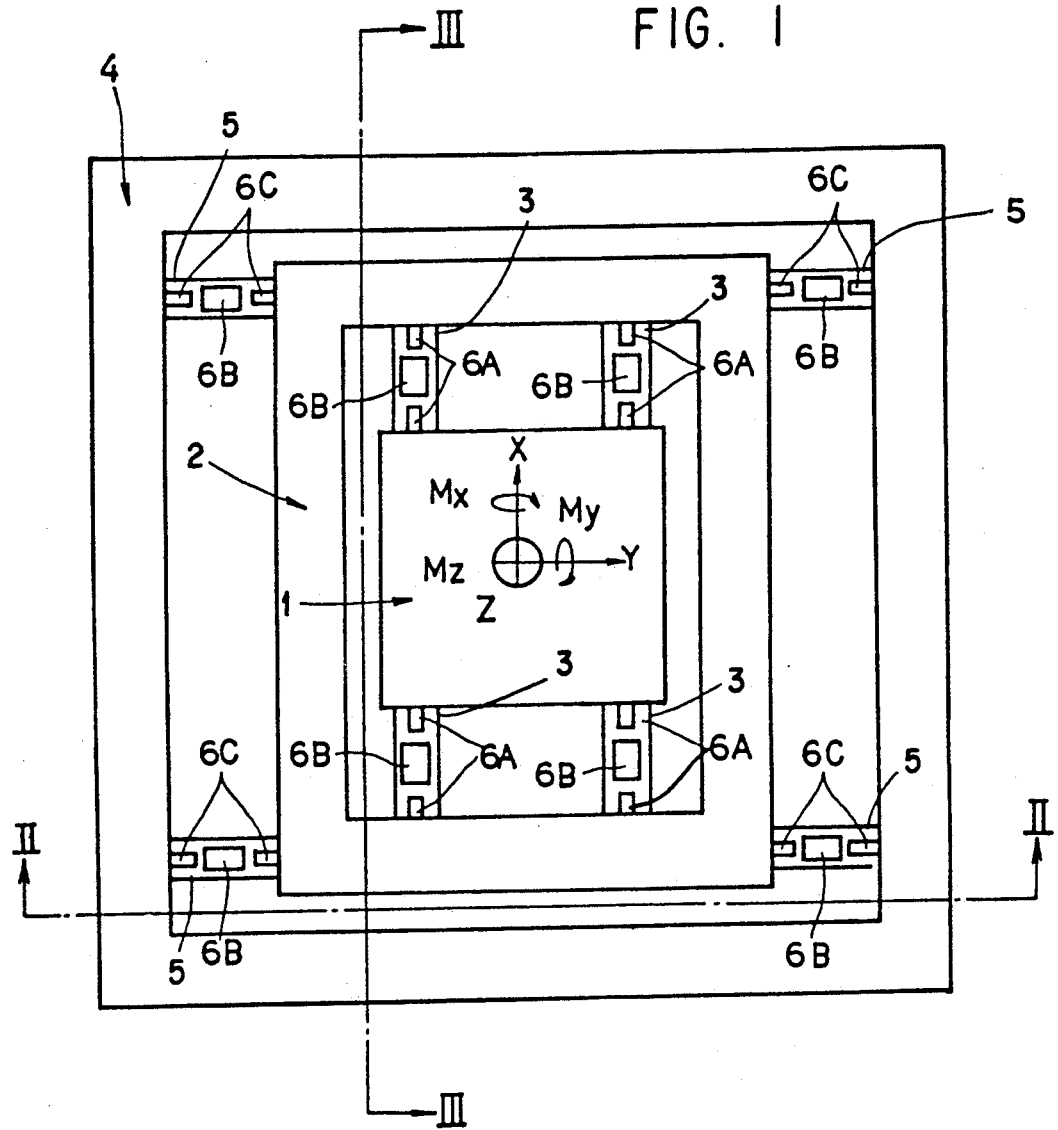
FIG. 1 is a schematic plan view showing the preferred embodiment of the present invention.
Figure 2:
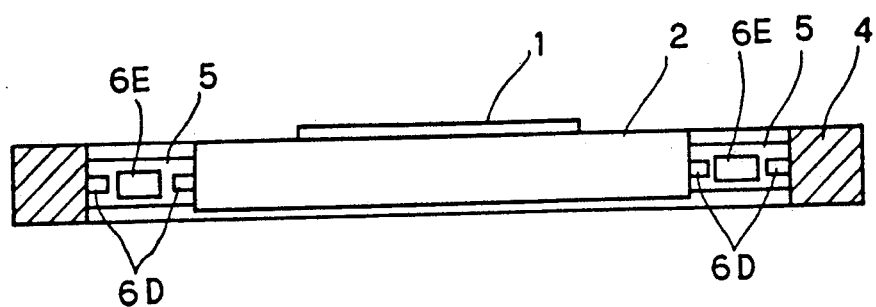
FIG. 2 is a sectional view taken along the line II—II in FIG. 1.
Figure 3:
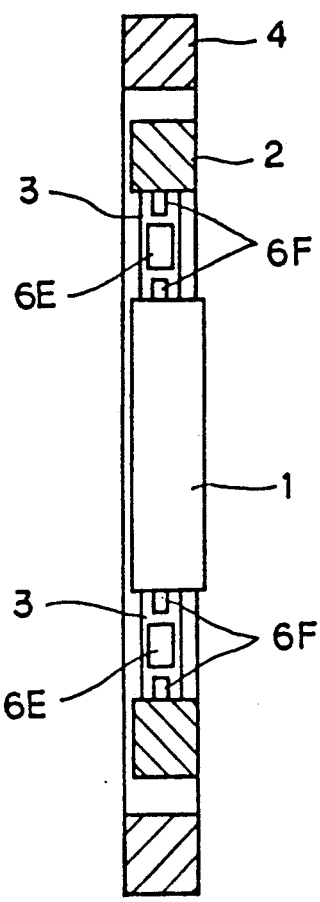
FIG. 3 is a sectional view taken along the line III—III in FIG. 1.

FIG. 1 is a schematic plan view of the measuring equipment according to the present invention. As seen, two sides (parallel to each other) of a load receiving plate 1 to which a load is applied are coupled to two sides (of which the inner faces are parallel to each other) of an inner frame 2 enclosing the load receiving plate 1 by means of at least four inner beams 3. Also two opposite sides of an outer frame 4 enclosing the inner frame 2 are coupled to two sides of the inner frame 2 by means of at least four outer beams 5 in a direction perpendicular to the inner beams 3. When the measuring equipment is set, the bottom of the outer frame 4 rests on the floor surface while the inner frame 2 and load receiving plate 1 are off the the surface. Namely, the beams 3 and 5 are so designed and located as to deflect when a load is applied to the load receiving plate 1. The inner beams have strain gauges 6A provided at both ends on the top and bottom sides thereof, and similar strain gauges 6B provided at the center on the top and bottom sides thereof. Also, the outer beams 5 have strain gauges 6C at opposite ends provided on the top and bottom sides thereof. Also, the outer beams 5 have strain gauges 6D provided on both sides thereof, and strain gauges 6E at the center provided on both the sides thereof, as shown in FIG. 2. Furthermore, the inner beams 3 have strain gauges 6E provided at the center on both sides thereof, and strain gauges 6F at opposite ends on both the sides thereof. The load in one direction in the horizontal plane of the load receiving plate 1, namely, in the X-axial direction, is measured by detecting the bending strains of the outer beams 5 by the strain gauges 6D provided at opposite ends on both sides of the outer beams 5. Also, the load in the Y-axial direction perpendicular to the X-axial direction in the horizontal plane is measured by detecting the bending strains by the strain gauges 6F provided at opposite ends on both sides of the inner beams 3. And the load in the direction perpendicular to the load receiving plate 1, namely, in the Z-axial direction is measured by detecting the shearing strains by the strain gauges 6E provided at the center on the sides of the inner beams 3 and outer beams 5, respectively. Further, the moment around the X-axis, that is, the moment $M_x$, is measured by detecting the bending strains by the strain gauges 6C provided at the opposite ends on the top and bottom of the outer beams 5. The moment around the Y-axis, namely, the momemt $M_y$, is measured by the strain gauges 6A provided at the opposite ends on the top and bottom of the inner beams 3. The moment around the Z-axis, that is, the moment $M_z$, is measured by detecting the shearing strain by the strain gauges 6B.

Figure 4:
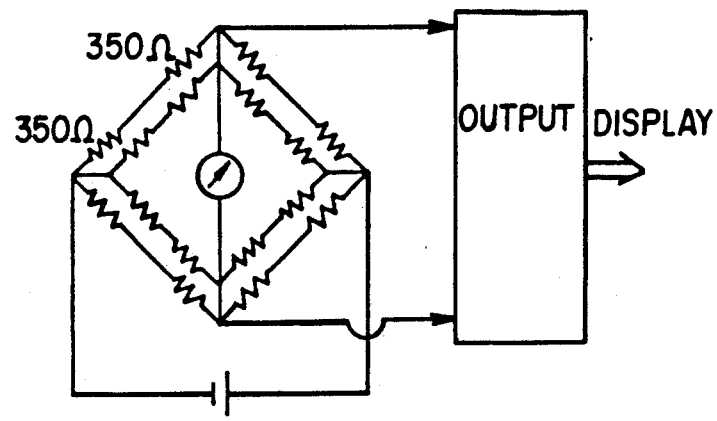
FIG. 4 and 5 are example bridge connection diagrams, respectively, of the strain gauge.
Figure 5:
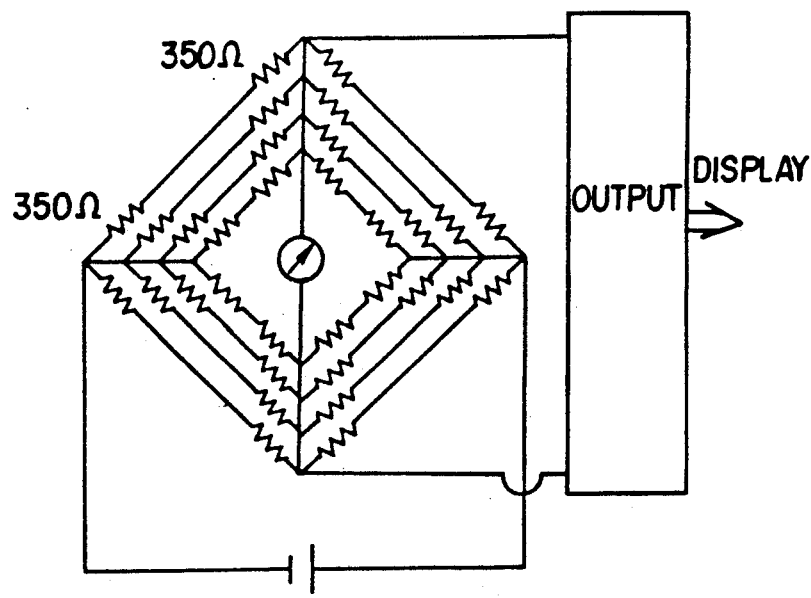

FIG. 4 is an example bridge connection diagram of the strain gauge for detecting the loads in the X- and Y-axial directions and the moments around the X- and Y-axes. FIG. 5 is an example bridge connection diagram of the strain gauge for detecting the load in the Z-axial direction and the moment around the Z-axis. The combination of the strain gauges 6A to 6F, and the bridge connection of these strain gauges may of course be those appropriately selected from a variety of well-known ones. The load in each axial direction can be measured by detecting either the shearing or bending strain.

For measuring the Z-axial load to the load receiving plate 1, for example, the weight of a vehicle or the like, a total of eight strain gauges 6E provided at the center on the sides of the four inner beams 3 and a total of eight strain gauges 6E provided at the center on the sides of the outer beams 5 are used. The resistor of each of the strain gauges 6E is so disposed as to form an angle of 45 deg. with respect to the direction in which the load is applied. A predetermined voltage is applied to the strain gauges 6E, and when a Z-axial load acts on the load receiving plate 1, the mean value of the sum of the voltages delivered from the strain gauges 6E is delivered as amplified by an amplifier (not shown) and displayed on an appropriate indicator.

The X- and Y-axial loads can be measured similarly to the Z-axial load, and also the moment around each axis can be measured similarly.

The measuring equipment thus constructed according to the present invention can be designed to be an integral plate-like structure comprising the load receiving plate 1, inner frame 2, outer frame 4, inner beams 3 and outer beams 5 by which the plate 1, inner frame 2 and outer frame 4 are coupled to one another. This integral plate-like structure may be made of steel plate, aluminum, duralumin, ceramic, plastic or a similar material. The measuring equipment may be about 5 cm high at maximum, and can be designed extremely lightweight though the weight of the equipment depnds upon the material used. Furthermore, the inner beams 3 and outer beams 5 may be more than four in number. Increased numbers of the strain gauges 6A to 6F may be adopted.

The measuring equipment having been described in the foregoing can be applied in various fields, and it may of course be used similarly to the measuring equipment disclosed in the previously mentioned U.S. Pat. No. 4,726,436 and which also uses strain gauges. Moreover, the load receiving plate 1 may be so constructed as to overhang the periphery of the measuring equipment, that is, the inner frame 2 and outer frame 4.

As having been described in the foregoing, the embodiment of the present invention is so constructed as to measure the X-, Y- and Z-axial loads and a total of six components of the moments around these axes, but the equipment may be so constructed through selection of the strain gauges 6A to 6F as to measure at least three components of the moments.

What is claimed is:

1. Measuring apparatus, comprising:
   a load receiving plate to which a load is to be applied;
   an inner frame enclosing said load receiving plate;
   at least four inner beams coupling two opposite sides of said load receiving plate to two opposite sides of said inner frame;
   an outer frame enclosing said inner frame;
   at least four outer beams coupling two opposite sides of said outer frame to two opposite sides of said inner frame in directions perpendicular to said inner beams; whereby said load receiving plate and inner frame are supported by said outer frame; and
   bending strain gauges provided on said inner and outer beams at end portions thereof;
   strains of said beams, when a load is applied to said load receiving plate, being detected by said strain gauges, and electrically processed and amplified to measure the load.

2. Measuring apparatus according to claim 1, wherein said strain gauges provided on said inner and outer beams detect more than three of a load in a direction perpendicular to said load receiving plate, that is, in the Z-axial direction, loads in the X- and Y-axial directions perpendicular to each other in the horizontal plane of said load receiving plate, and moments around said X-, Y- and Z-axes, respectively.

3. Measuring apparatus according to claim 2, wherein said strain gauges provided on said inner and outer beams include those destined for detection of the X-, Y- and Z-axial loads.

4. Measuring apparatus according to claim 3, wherein said strain gauges provided on said inner and/or outer beams include those destined for detection of at least one of the moments around the X-, Y- and Z-axes, respectively.

5. A measuring equipment according to claim 2, wherein said strain gauges provided on said inner and outer beams include those destined for detection of the moments around said X-, Y- and Z-axes, respectively.

6. Measuring apparatus according to claim 5, wherein said strain gauges provided on said inner beams and/or outer include those destined for detection of more than one or two among the X-, Y- and Z-axial loads.

7. A measuring equipment according to claim 1, wherein said load receiving plate, inner and outer frames are coupled to one another by means of said inner and outer beams and assembled into an integral plate-like structure.

* * * * *